(12) United States Patent
Finlayson et al.

(10) Patent No.: US 12,422,670 B2
(45) Date of Patent: Sep. 23, 2025

(54) SYSTEM AND METHOD FOR GENERATING A COLOUR FILTER FOR MODIFYING THE SPECTRAL RESPONSE OF A VISION SYSTEM

(71) Applicant: UEA ENTERPRISES LTD, Norwich (GB)

(72) Inventors: Graham Finlayson, Norwich (GB); Yuteng Zhu, Norwich (GB)

(73) Assignee: UEA ENTERPRISES LTD, Norwich (GB)

( * ) Notice: Subject to any disclaimer, the term of this patent is extended or adjusted under 35 U.S.C. 154(b) by 1010 days.

(21) Appl. No.: 17/292,995

(22) PCT Filed: Nov. 12, 2019

(86) PCT No.: PCT/GB2019/053206
§ 371 (c)(1),
(2) Date: May 11, 2021

(87) PCT Pub. No.: WO2020/099860
PCT Pub. Date: May 22, 2020

(65) Prior Publication Data
US 2022/0003988 A1    Jan. 6, 2022

(30) Foreign Application Priority Data
Nov. 12, 2018 (GB) ..................... 1818392

(51) Int. Cl.
G02B 27/00 (2006.01)
G01J 3/46 (2006.01)

(52) U.S. Cl.
CPC .......... *G02B 27/0012* (2013.01); *G01J 3/462* (2013.01); *G01J 3/463* (2013.01); *G01J 3/465* (2013.01)

(58) Field of Classification Search
CPC ...... G02B 27/0012; G01J 3/462; G01J 3/463; G01J 3/465
See application file for complete search history.

(56) References Cited

U.S. PATENT DOCUMENTS 5,479,524 A    12/1995  Farrell et al.
9,030,580 B2 *  5/2015  Meng ................ G01J 3/462
                                                     382/167

(Continued)

FOREIGN PATENT DOCUMENTS

EP       0637732 A1    2/1995
WO    2012119158 A1    9/2012

OTHER PUBLICATIONS

Burggraaff et al., Standardized spectral and radiometric calibration of consumer cameras, Jul. 8, 2019, Optics Express, vol. 27, No. 14, pp. 19075-19101 (Year: 2019).*

(Continued)

*Primary Examiner* — Mi'schita' Henson
(74) *Attorney, Agent, or Firm* — THOMAS HORSTEMEYER, LLP

(57) ABSTRACT

A system and method for generating a colour filter for modifying the spectral response of a vision system are disclosed. The method includes receiving an RGB spectral response of the vision system for a colour target under predetermined illumination and executing, by a processor of a computer system, computer program instructions configured to apply the RGB spectral response to a bilinear optimisation problem that simultaneously determines: i) a colour correction matrix to transform the RGB spectral response to XYZ colour space; and, ii) parameters of the colour filter. The method further executes computer program instructions configured solving the bilinear optimisation (Continued)

problem; and then provides the parameters or causes a colour filter to be formed using the parameters.

21 Claims, 8 Drawing Sheets

(56) References Cited

U.S. PATENT DOCUMENTS

| | | | |
|---|---|---|---|
| 9,163,990 B2* | 10/2015 | Lianza | G01J 3/524 |
| 9,532,021 B2* | 12/2016 | Kato | H04N 9/74 |
| 10,338,286 B2 | 7/2019 | Schmeder et al. | |
| 10,852,461 B2 | 12/2020 | Schmeder et al. | |
| 2011/0211099 A1* | 9/2011 | Nayar | H04N 25/135 |
| | | | 348/278 |
| 2014/0233105 A1 | 8/2014 | Schmeder et al. | |
| 2016/0148354 A1 | 5/2016 | Finlayson et al. | |
| 2017/0116885 A1 | 4/2017 | Wilczek et al. | |
| 2017/0193925 A1 | 7/2017 | Park et al. | |
| 2018/0095202 A1 | 4/2018 | Schmeder et al. | |
| 2024/0146890 A1* | 5/2024 | Finlayson | H04N 9/67 |

OTHER PUBLICATIONS

International Search Report & Written Opinion for PCT/GB2019/053206 mailed Mar. 24, 2020.

* cited by examiner

SYSTEM AND METHOD FOR GENERATING A COLOUR FILTER FOR MODIFYING THE SPECTRAL RESPONSE OF A VISION SYSTEM

CROSS-REFERENCE TO RELATED APPLICATIONS

This application is a 35 U.S.C. § 371 National Stage Patent Application of, and claims priority to, Patent Cooperation Treaty Application number PCT/GB2019/053206, filed on 12 Nov. 2019, and entitled "SYSTEM AND METHOD FOR GENERATING A COLOUR FILTER FOR MODIFYING THE SPECTRAL RESPONSE OF A VISION SYSTEM," which claims priority to and the benefit of Great Britain Patent Application number 1818392.1 filed on 12 Nov. 2018, where both of these applications are incorporated herein by reference in their entirety.

FIELD OF THE INVENTION

The present invention related to a system and method for generating a colour filter for modifying the spectral response of a vision system and in particular to a system and method in which the filter is designed to make the vision system more colorimetric.

BACKGROUND TO THE INVENTION

The human vision system is far more complex than digital camera systems. The spectral sensitivities of a camera are designed to satisfy many objectives including manufacturability and the need to minimize the conspicuity of noise when the raw RGBs are transformed for display. As a consequence, most cameras do not 'see' like we do. That is the RGBs a camera measures are not a linear transform from colour matching triplets.

Colorimetric can mean that a modified vision system (e.g. the vision system that sees the world through the colour filter) matches colour more like a standard observer. The vision system could be a colour camera or it could be a human observer. In regard to a colour camera, colorimetric can also mean finding a filter such that the recorded RGB signal in combination with a linear transform produces measurements that are closer to those made by a standard observer.

More formally, a camera 'sees' like we do—with a simple linear colour correction—if and only if the Luther condition is met i.e. its spectral sensitivities are a linear combination of the corresponding human visual system matching curves (or equivalently a linear combination of the XYZ colour matching functions).

Digital cameras often use sensors having (or determining) Red, Green and Blue pixels that in turn produce RGB signals that correspond to the intensity of light sensed at that pixel. Mapping the raw RGBs measured by a camera to either display coordinates (such as sRGB) or the XYZ tristimuli—a human vision system referenced colour space—is called colour correction. Colour correction is an essential procedure in the camera pipeline since cameras do not "see" the world as humans do. Fundamentally, this is because the relationship between the spectral sensitivities of a camera and human visual matching functions is not a linear mapping. Explicitly, the Luther condition is not satisfied.

The Luther condition states that a camera is colorimetric if its spectral sensitivities are a linear transform from the XYZ colour matching functions.

Many different algorithms have been developed for solving the colour correction problem. The most common method is to apply a linear correction transform mapping RGBs to XYZs (or display RGBs). While linear correction generally works well, it can still fail in a large number of cases, especially for saturated colours.

A pragmatic way to proceed—and the one that is generally implemented in camera image processing pipelines—is to apply a correction transform that has been determined mathematically at the design/manufacturing stage of the camera that given the captured RGBs brings them as close as possible to the desired XYZs (or display RGBs). The preponderance of methods take a regression approach and involves either linearly correcting RGBs or non-linearly correcting a polynomial-type expansion of RGBs. Other mappings include look-up-tables, and artificial neural networks.

However, most non-linear methods are not invariant to exposure change. Indeed, given two input RGBs $\underline{p}$ and $k\underline{p}$, the outputs of colour correction are $\underline{q}$ and $k\underline{q}$ if it is exposure invariant. In one approach, a root-polynomial method was developed that is exposure invariant. Another way of achieving better colour fidelity is to make more than three measurements. However, when more sensors are used, the acquisition is generally more complex and suffers from problems such as reduced resolution (when sensor filter mosaic is used) or registration problem (when multiple pictures are captured). Multispectral and hyperspectral camera systems are much more expensive than conventional cameras and are not widely deployed.

An alternate approach to increase the dimensionality of a camera system is to take two pictures of every scene with and without a coloured filter. This generates a higher dimensional representation with respect to which a linear combination can better predict what we see (e.g. better predict XYZ tristimulus values). Of course, this approach requires the two images to be registered (a far from easy problem to solve). Additionally, it necessitates a longer capture process where the user has to change filters between image captures. As for the multispectral approach, it is characterized by longer capture time and much more expensive imagers.

Regarding a colour filter we might also think of the visual response of a human observer. Particularly, relevant to this invention is the response of anomalous colour blind observers. Colour blind people are typically men (and about 10% of men suffer from colour blindness). Interestingly, and wrongly, colour blindness is sometimes thought to be the absence of a class of sensor. A colour normal person will have three colour mechanisms—called the cones—which are sensitive to long-, medium- and short-wave light. A pure colour blind person—a pure deuteranope—is missing the medium-wave mechanism. However, most deuteranopes are so-called anomalous observers. They are not missing the medium-wave sensor but rather have two long-wave mechanisms which are spectrally slightly different.

There is a long history of finding colour filters which attempt to aid how colour blind people see. These include Xchrom and Chromagenic filters. Recently, Enchroma have developed a 'notch filter' approach. Here their filter basically transmits close to 100% of the light at all wavelengths across the visible spectrum except at 3 narrow wavelength bands where all the light is absorbed. The idea is that the notch filter multiplied by the anomalous spectral sensitivities of the colour blind observer would results in new sensitivities where there was more difference between (in the case of deuteranopes) the two long-wave-mechanisms. This contrast would give the Enchroma observer a different experience of the world.

STATEMENT OF INVENTION

According to an aspect of the present invention, there is provided a method for generating a colour filter for modifying the spectral response of a vision system, the method comprising:

receiving an RGB spectral response of the vision system for a colour target under predetermined illumination;

executing, by a processor of a computer system, computer program instructions configured to apply the RGB spectral response to a bilinear optimisation problem that simultaneously determines:
  i) a colour correction matrix to transform the RGB spectral response to XYZ colour space; and,
  ii) parameters of the colour filter;

executing computer program instructions configured solving the bilinear optimisation problem; and, providing a colour filter using the parameters.

Preferably, the XYZ colour space is determined using a colour matching routine for the colour target under the predetermined illumination.

The colour matching routine may be performed by a visual system having spectral sensitivities that are linearly related to human visual system spectral sensitivities.

The colour matching routine may be a CIE XYZ colour matching function.

The RGB spectral response may be obtained from an observer with normal colour vision and XYZ colour space may be determined by an observer suffering from colour blindness.

Preferably, the colour target is illuminated by a reference set of illuminant spectra and has predetermined surface reflectances.

The problem may be formulated as a bilinear least-squares estimation problem. The step of executing computer program instructions configured solving the bilinear optimisation problem may comprises solving the bilinear optimisation problem using alternating least-squares. The step of executing computer program instructions configured solving the bilinear optimisation problem may comprise solving the bilinear optimisation problem using random, sampling and consensus.

The step of executing computer program instructions configured solving the bilinear optimisation problem may include executing computer program instructions to regulate the solution to control the shape of the filter.

The method may further comprise sampling across the RGB spectral response and XYZ colour space across 400 nm to 700 nm light spectra at predetermined intervals to give A samples for each of the RGB and XYZ.

The predetermined interval may be a 10 nm interval.

The method may further comprise forming an RGB matrix and an XYZ matrix from the respective A sampled values and solving the optimisation problem from the matrices for the matrix M that best maps RGBs to XYZ tristimuli.

The step of solving may be by alternating least squares, ALS, the method further comprising:
  making an initial guess for a starting point from which to optimise the filter by ignoring a linear correction term M;
  holding the filter fixed and solving for M;
  estimating new corrected spectral sensitivities;
  repeating the ALS optimization until convergence.

The method may further comprise constraining the filter to be between 0 and 100% transmissive using Quadratic programming.

The method may be operated to seek a filter to minimize a non-linear error metric including CIE Lab.

The step of providing the parameters may comprise selecting a closest singular match, or a closest match by combining filters, from a predetermined set of existing filters.

The step of providing may comprise providing the parameters to a manufacturing system to create the filter.

The step of providing may comprise generating control signals to cause a smart glass or programmable optical filters to operate according to the parameters.

The method may further comprise capturing two RGB response images, one image with and one without a filter between the vision system and the target, finding a 6×3 linear matrix mapping the 6 pixel measurements to the target XYZs, the 6 pixel measurements being the R, G, and B values from each image.

The step of capturing may comprise taking the two images successively.

The step of capturing may comprise splitting light from a scene into two optical paths and capturing one image from each of the two paths for simultaneous capture.

According to another aspect of the present invention, there is provided a system for generating a colour filter for modifying the spectral response of a vision system, the system comprising:

an input interface configured to receive an RGB spectral response of the vision system for a colour target under predetermined illumination;

a processor configured to execute computer program instructions configured to apply the RGB spectral response to a bilinear optimisation problem and solve the problem to simultaneously determine:
  i) a colour correction matrix to transform the RGB spectral response to XYZ colour space; and,
  ii) parameters of the colour filter; and, an output interface configured to provide the parameters for the colour filter.

According to an aspect of the present invention, there is provided a method for spectrally modulating the light entering a first visual system so that the modified visual system's response is linearly related to the response of a second visual system observing the unmodulated light.

According to an aspect of the present invention, there is provided a method for generating a colour filter for a vision system comprising:
  receiving an RGB spectral response of the vision system for a colour target under predetermined illumination;
  applying the RGB spectral response in a bilinear optimisation problem that simultaneously determines a colour correction matrix to transform the RGB spectral response to XYZ colour space and parameters of the colour filter;
  solving the bilinear optimisation problem;
  using the parameters of the filter to generate a colour filter for the vision system.

We can think of a colour filter as modulating the spectrum of light reaching a camera or eye. To a first approximation we could modulate the light source as prescribed by the filter (and not have a filter) and the effect on the recorded sensor values would be similar (as if the light was not changed and a filter were used).

Preferably, however, the modulation is implemented by a transmissive filter placed in front of the first visual system.

The modulation may also be implemented by spectrally adjusting the illuminant spectral power distribution lighting a scene.

The modulation may be a combination of a transmissive filter and a spectral adjustment of the illumination lighting a scene.

The first visual system may be a colour camera and the second may have spectral sensitivities that are linearly related to human visual system spectral sensitivities.

CIE XYZ colour matching functions may be used.

Measured linear response mechanisms of the eye may be used (including linear combinations of these mechanisms)

The second visual system may be related to an observer with normal colour vision and the first may be related to an observer who suffers from colour blindness Embodiments may produce a modulated spectral response designed to aid a colour blind observer to match colours—according to the colour matching experiment—more like an observer with normal colour vision.

We are also interested in helping colour blind observers see more but unlike in prior approaches, we tie the filter design process to the colour matching problem.

The whole of colorimetry is based on colour matching. If an observer sees a test light in one part of the visual field the colour matching problem requires the observer to mix proportions of (typically) red, green and blue primary lights to produce a visual match to the test light.

If the test lights are, in succession, chosen to be the individual wavelengths across the visible spectrum then per-wavelength we can plot the mixture of R, G and B needed to match the light at that wavelength. The resulting curves are called colour matching functions. Because the eye (and cameras) respond linearly to light it is easy to show that we can find the match mixture for an arbitrary test light by integrating the test light with the colour matching functions.

Equivalently, the ideal camera sensitivities to measure the RGBs that can directly drive a display (with the aforementioned primaries) are exactly the colour matching functions.

The colour matching problem formulation has an interesting and useful property. If we make filter such that the new filtered sensitivities are linearly related to the standard observer then the colour matches (the mixture combinations) found for the filtered sensitivities is the same as for the standard observer. Put another way a visual system with 3 spectral sensitivity functions implies a set of colour matching functions given a set of primary lights. If we have a second visual system with sensitivities that are a linear transform from the first and run a colour matching experiment we derive the same colour matching functions. In a colorimetric sense both these vision systems see colour in the same way.

Optimal spectral modulation may be found through optimisation using knowledge of the first and second visual system's spectral sensitivities.

Optimal spectral modulation may be found through optimisation using knowledge of the first and second visual system's spectral sensitivities and a reference set of illuminant spectra and surface reflectances.

While colorimetric in a strict physical sense pertains to the colour matching experiment as described above. However, colourimerty does not account for other aspects of vision. Indeed, it is well known that is we see the same object on bright or dark surrounds our perceived colour changes yet the colourimetric measurements stay the same. Generalising the concept of colour matching means we would like to find a filter that best helps one visual system 'see' like another. As an example, in colour appearance models the colour and intensity of the surround colours are part of the computation that predicts the colour we see. Colour appearance models are, mathematically, complex non-linear formula. Thus, according to selected embodiments of the present invention, we also seek to find a filter that allows the measurements taken be a filter corrected vision system to be non-linearly corrected to match perceptual correlates.

Preferred embodiments may include a method for spectrally modulating the light entering a first visual system so that the modified visual system's response is non-linearly related to the response of a second visual system observing the unmodulated light.

Preferred embodiments may include a method for spectrally modulating the light entering a first visual system so that the modified visual system's response is non-linearly related to a non-linear function of a second visual system observing the unmodulated light The second visual system may be related to a human observer and the non-linear function applied to the responses of the second visual system models the non-linear processing carried out by the human visual system The first visual system may be a human observer who is colour blind.

The first visual system may be a human observer who suffers from visual stress, including dyslexia The first visual system may be a human observer and the second is a human observer with reduced Melanopsin response.

Optimal spectral modulation may be found through optimisation using knowledge of the first and second visual system's spectral sensitivities and the non-linear processing applied to the second visual system's responses.

Optimal spectral modulation may be found through optimisation using knowledge of the first and second visual system's spectral sensitivities and the non-linear processing applied to the second visual system's responses and a reference set of illuminant spectra and surface reflectances.

In embodiments of the present invention, the aim is not to increase the dimensionality of capture. Rather a filter is found such that the device sensitivities multiplied by the filter and then linearly transformed by a 3×3 matrix are as close as possible to the XYZ colour matching functions. We call this method spectral-based colorimetric filter design.

Preferred embodiments approach filter design as a way of best trying to ensure a vision system such as a camera measures the same XYZs that we see for a single given illuminant condition.

An embodiment of the current invention finds the filter that when multiplied by the spectral sensitivities of a first visual system are close to being in linear relation to the visual sensitivities of a second visual systems (including the XYZ colour matching functions). This embodiment makes the least assumptions about the world and in so-doing will find a filter that will allow a visual system to capture responses which are always almost a fixed linear combination of the target responses. However, this generality places a strong constraint on the shape of the filter.

Embodiments of the present invention include a method for finding the optimal filter given a set of typical surfaces and lights. In one embodiment, the problem is formulated as a bilinear least-squares estimation problem (linear in the filter and the colour correction) and this, in a preferred embodiment, is solved using Alternating Least-Squares (ALS) technique. For a range of different cameras, experimental results show that it is possible using this approach to find an optimal colour correction filter with respect to which the cameras are almost colorimetric. By adopting models of typical spectra the second preferred embodiment (algorithm 2 discussed below) supports greater flexibility in the filter design. In this embodiment we can find highly transmissive filters which are smooth (and so manufactureable) and also, in practice, allow the first visual system to capture responses in linear relation to a second visual system. Alternative optimisations to Alternating Least Squares include the RANSAC optimisation approach. In this approach we, effectively, find m colours (a subset of the total) that we wish to minimise the error. For the discovered filter and linear correction we then assess the error of this filter and linear transform applied to the rest of the data. We repeat this method with a second, third and in general kth set of m colours. For each set we assess the discovered filter and linear transform relative to the data outside the set. RANSAC stands for Random, Sampling and Consensus.

For some cameras there exists a filter that makes them almost colorimetric and for all cameras there exists filters which render them more colorimeric. In selected embodiments of the present invention a filter is sought that will allow a camera to capture colorimetric data for all possible spectra. Yet, the spectra we measure in the world are not arbitrary. In particular, surface reflectances are smooth and can be well approximated by low dimensional linear models. Preferred embodiments of the present invention include a system and method for finding and generating a filter that makes a camera as colorimetric as possible for a given set of measured lights and surfaces. Using a more restrictive model of lights and surfaces (albeit one that captures all typical real-world situations) has the advantage of allowing greater flexibility in how the filters are designed. With respect to the constrained optimisation we can find highly transmissive and smooth filters that make cameras much more colorimetric and these filters are easier to manufacture.

While the idea of placing a coloured filter in front of a camera to make it more colorimetric is known, the point of prior approaches was to increase the dimensionality of the capture in order to enable better post-processing. Specifically, two images of a scene were taken with and without the filter. In contrast, embodiments of the present invention seek to generate a filter that changes the spectral characteristics of the sensor itself and makes captured images more colorimetric without the need for post processing. For the application of making a colour blind person more colorimetric it is also clearly impossible to assume that observer has access to filtered and unfiltered images.

In particular, embodiments of the present invention seek to find and generate a filter to make a camera more colorimetric. This is done in tandem with finding the best colour correction transform taking RGBs to XYZs.

In preferred embodiments, simultaneous calculation of the colour filter and colour correction matrix is formulated as a bilinear optimisation problem and solved using Alternating Least-Squares (ALS). The optimisation is regulated to control the shape of the filter (e.g. its transmittance property).

Embodiments of the present invention seek to find a filter so that the effective camera sensitivities (filter multiplied by the native camera sensitivities) are a linear combination from a target set of spectral sensitivities (e.g. the CIE XYZ colour matching functions). We might also consider capturing two images with and without a filter and then finding a 6×3 linear matrix mapping the 6 pixel measurements to the target XYZs (for example). With respect to this double capture scenario, the filter design process is similar (a similar algorithm and one that follows naturally from the ALS method in the given text is used) but the discovered filter will, of course, be different.

Of course, now we need to consider how two images—with and without a filter—are captured. Two images could be taken successively (via a camera with a filter wheel arrangement). For the successive capture scenario the images would then need to be registered so corresponding pixels are in alignment. In a second approach, a neutral beam splitter approach to split the light from a scene into two optical paths and then two images are captured simultaneously (with and without the derived filter). Here, no registration is needed.

BRIEF DESCRIPTION OF THE DRAWINGS

Embodiments of the present invention will now be described, by way of example only, with reference to the accompanying drawings in which.

DETAILED DESCRIPTION

Figure 1A:
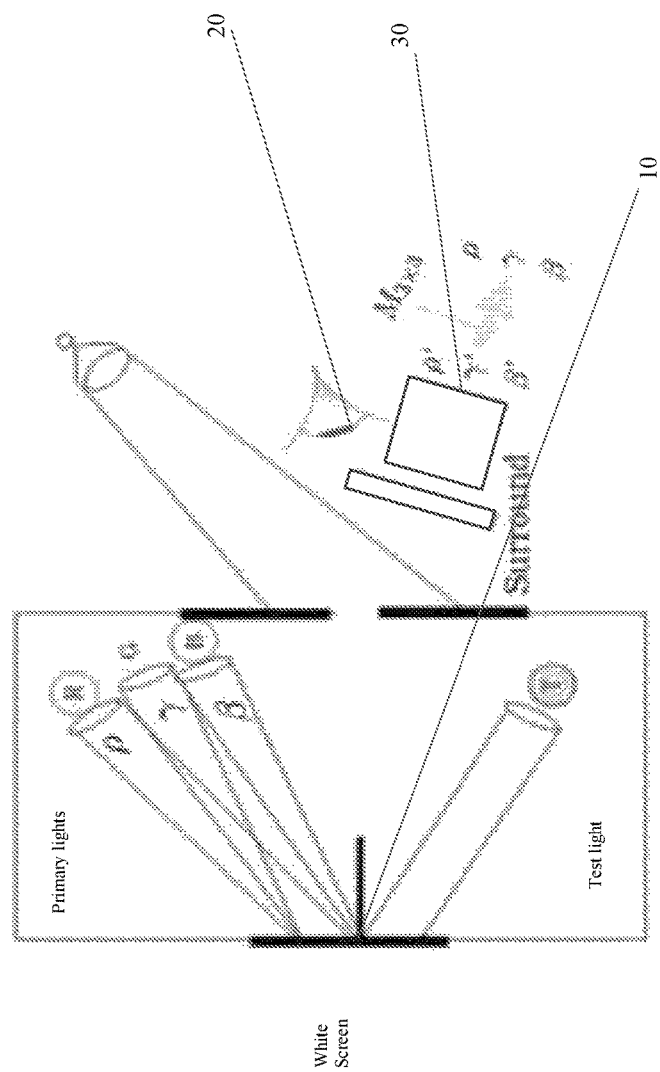
FIGS. 1a and 1b are illustrations of aspects of a different methods for capturing data for use in embodiments of the present invention.
Figure 1B:
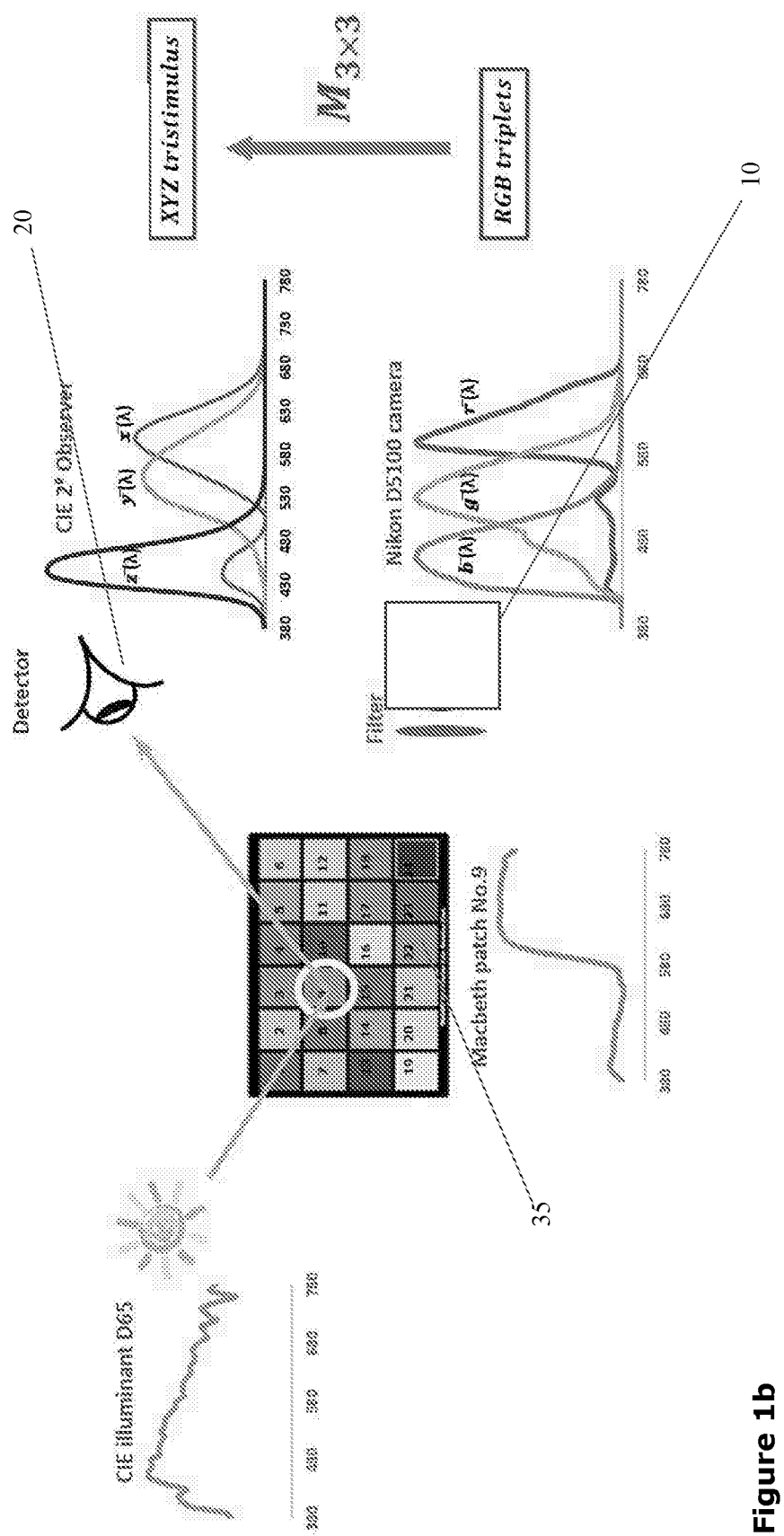

FIGS. 1a and 1b are illustrations of aspects of a different methods for capturing data for use in embodiments of the present invention The method is attempting to find a filter such that the RGBs a camera 10 measures (after a 3×3 correction matrix) are the same as the colour mixtures a human observer 20 would make to find a match.

In FIG. 1a, this is based on a white screen 30 and in FIG. 1b it is based on a colour patch 35 with known reflectances.

Note that the filter is red here is for illustration (the best filter colour is not a priori specified). Determine a filter (placed in front) for a corresponding camera such that the RGB outputs after a linear mapping become the same as perceptual XYZ tristimulus results. Note that the human eye 20 and camera system 10 should be placed at the same viewing geometry in practice.

In FIG. 1b we see a standard D65 illuminant lighting a colour target with known reflectances. Given these spectra and the spectral sensitivities of the camera and XYZ colour matching functions, we can calculate the camera RGB responses and XYZ triplets respectively. In the optimisation we seek to find a colour filter (red rectangle in the Figure) in combination with a 3×3 colour correction transform.

The method applied in embodiments of the present invention builds upon the Luther condition. If $Q(\lambda)$ denotes the vector of red-spectral, green-spectral and blue-spectral sensitivities and $\chi(\lambda)$ denotes the XYZ colour matching functions, then an explicit Luther condition inspired formulation of the filter design problem can be modelled as:

$$\min_{f(\lambda),M} \|f(\lambda)[MtQ(\lambda)] - X(\lambda)\| \qquad (1)$$

where f(λ) defines the spectral transmittance of the colour filter, and M is a fixed 3×3 linear transformation matrix.

FIGS. 1a and 1b illustrate Equation 1 with respect to the colour matching experiment. Here the goal of the observer is to adjust the intensities of the three primary lights (R, G and B) to make a colour that looks identical to the test light. In this example, R, G and B are set to respectively the intensities ρ, γ, β in order to make a visual match. In FIGS. 1a and 1b, a filter, shown in red in front of the camera, is sought so that the camera RGBs multiplied by matrix M record the same triplets as the observer does under the same viewing conditions. That is the camera 'sees' the mixture of the intensities a human observer would use to make a match.

There are three important physical variables to consider in image formation. First, there are the surface reflectance properties of the objects in the scene. Second, we must consider the illumination or illuminations under which a scene is viewed. Lastly, the spectral characteristic of the sensors is an important variable.

Suppose a light E(λ) strikes a surface S(λ) then, under the Lambertian model of image formation, the reflected light C(λ) is proportional to E(λ)S(λ). Given a set three spectral sensitivity functions (usually, short-, medium- and long-wave sensitive mechanisms or R, G and B), $\underline{Q}(\lambda)$, then the sensor response is defined as:

$$\underline{\rho} = \int_\omega C(\lambda)\underline{Q}(\lambda)d\lambda \quad (2)$$

where the integral is taken over the visible spectrum ω. Similarly, the colour response of human visual system can be defined as $$\underline{x} = \int_\omega C(\lambda)\underline{\chi}(\lambda)d\lambda \quad (3)$$

where $\underline{\chi}(\lambda)$ represents the observer colour matching functions (including long-, medium- and short-wavelengths).

In practice, the spectral data is measured through sampling across the visible spectrum, i.e. from 400 nm to 700 nm at a 10 nm interval, giving 31 values (it will however be appreciated that greater or lesser spectral ranges or sampling periods could be used that may result in more or less than 31 values). Given a discrete representation of the data, the integrals shown above can be replaced by vector-matrix multiplication.

$$\underline{\rho} = Q^t \underline{c} \quad (4)$$

$$\underline{x} = \chi^t \underline{C} \quad (5)$$

$\underline{c}$ denotes one colour signal spectrum as a 31×1 vector. Q and χ are 31×3 matrices. The 3-vector camera response $\underline{\rho}$ and visual system response $\underline{x}$ are 3×1 vectors.

A condition for a camera to measure the world colourimetrically (that is, for its RGBs to be a linear correction from XYZs) is for Q and χ to be a linear correction from one another, the so-called Luther condition:

$$\text{if } Q = \chi M \Rightarrow \underline{x}^t = \underline{\rho}^t M^{-1}$$

The Luther condition is strong. Arguably, for a fixed viewing illuminant, because the reflectance characteristics tend to be smooth, it may be possible to measure colourimetrically (to some small degree of error) without the Luther condition being met. Indeed, the colour fidelity we see on our smart phones is often reasonably good indicating that the exact Luther conditions are not always needed. But, equally, some colours—especially some saturated colours—are known to be not colour accurate and not colour correctable.

Given a N×31 matrix C of colour signal spectra (one spectrum per column) then, respectively, the camera responses and XYZ tristimuli are N×3 matrices written as $$P = C^t Q \quad (6)$$

$$X = C^t \chi \quad (7)$$

We can treat P and X as data matrices and the best colour correction can be written as a least-squares regression.

In linear colour correction we solve for the best 3×3 matrix M that best maps camera RGBs to XYZ tristimuli. Therefore, we minimize:

$$\min_M \|PM - X\| \quad (8)$$

The matrix M can be solved for in closed form (using the Moore-Penrose inverse)

$$M = [P^t P]^{-1} P^t X = P^+ X \quad (9)$$

The 'book formula' shown in the right hand side of Equation 9 is called the Moore-Penrose inverse where the superscript $^+$ and $^t$ denote the pseudo-inverse and matrix transpose operation respectively.

Under the assumption that reflectances are sufficiently well modelled by a 3D linear model, then Equation 9 yields an M that supports perfect colour correction. However, there are many examples of cameras recording the wrong colours (i.e. the reproduction formed after colour correction has the wrong colours compared to what a human observer perceives when viewing the same scene). Further, the tolerance for measurement (e.g. to decide that one surface is the same colour as another) is tighter and a linear correction does not suffice.

Figure 2:
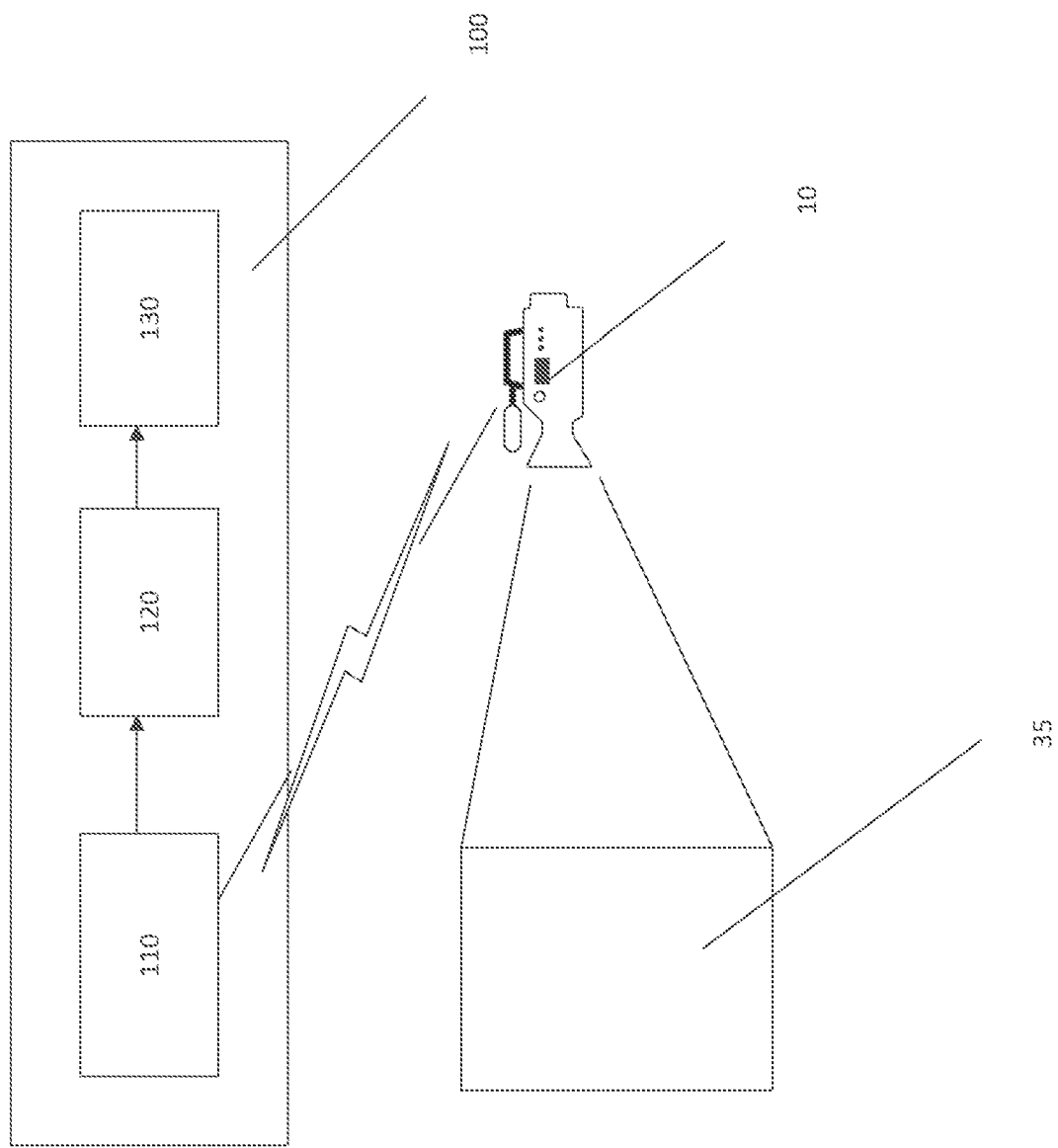
FIG. 2 is a schematic diagram of a system according to an embedment of the present invention.

FIG. 2 is a schematic diagram of a system according to an embedment of the present invention;

The system 100 is configured to generating a colour filter (or parameters from which a colour filter can be created, selected or configured) for modifying the spectral response of a vision system.

The system 100 includes an input interface 110 configured to receive an RGB spectral response of the vision system 10 for a colour target 35 under predetermined illumination.

The system further includes a processor 120 configured to execute computer program instructions configured to apply the RGB spectral response to a bilinear optimisation problem and solve the problem to simultaneously determine:
 i) a colour correction matrix to transform the RGB spectral response to XYZ colour space; and,
 ii) parameters of the colour filter.

Further, the system includes an output interface 130 configured to provide the parameters for the colour filter.

Embodiments of the present invention seek to determine properties of a filter that, when placed in its imaging path, make a camera more colorimetric. How then can the effect of a filter given the linear algebra formulation of colour formation be modelled? Suppose f (λ) denotes a transmittance filter and C(λ) a colour signal spectrum. Physically, the light passing though the filter is equal to the product of the spectra f(λ)C(λ).

The filter that best matches the Luther condition can be found by minimizing:

$$\min_{D,M} \|DQM - X\| \quad (10)$$

Here Q and χ are respectively N×3 matrices capturing the camera spectral sensitivities and the XYZ colour matching functions. N refers to the sampling number across the visible range (31 in the above example but as indicated, this may be varied). M is a 3×3 correction matrix. D is an N×N diagonal matrix. Mathematically, $D_{ii}$, the $i^{th}$ diagonal term in D multiplies the $i^{th}$ row in Q. That is, the three camera sensitivities at the $i^{th}$ wavelength are multiplied by the same value. D in the discrete domain is a physically accurate model of $f(\lambda)$ in Equation 1.

There is no closed form solution to Equation 16. Rather we solve for D and M, preferably using a technique called Alternating Least-Squares (ALS). Algorithm 1a is shown below where $\| \|F$ denotes the Frobenius norm (also see below in Equation 18).

---

Algorithm 1: Filter and Linear Matrix Estimation by ALS

1  $i = 0, Q^0 = Q$ ;
2  repeat
3  $\quad i = i + 1$;
4  $\quad \min_{D^i} \|D^i Q^{i-1} - \chi\|_F$;
5  $\quad \min_{M^i} \|D^i Q^{i-1} M^i - \chi\|_F$;
6  $\quad Q^i = D^i Q^{i-1} M^i$
7  until $\|Q^i - Q^{i-1}\|_F < \epsilon$ ;
$\quad\quad D = \Pi_i D^i$ and $M = \Pi_i M^i$

---

Figure 3:
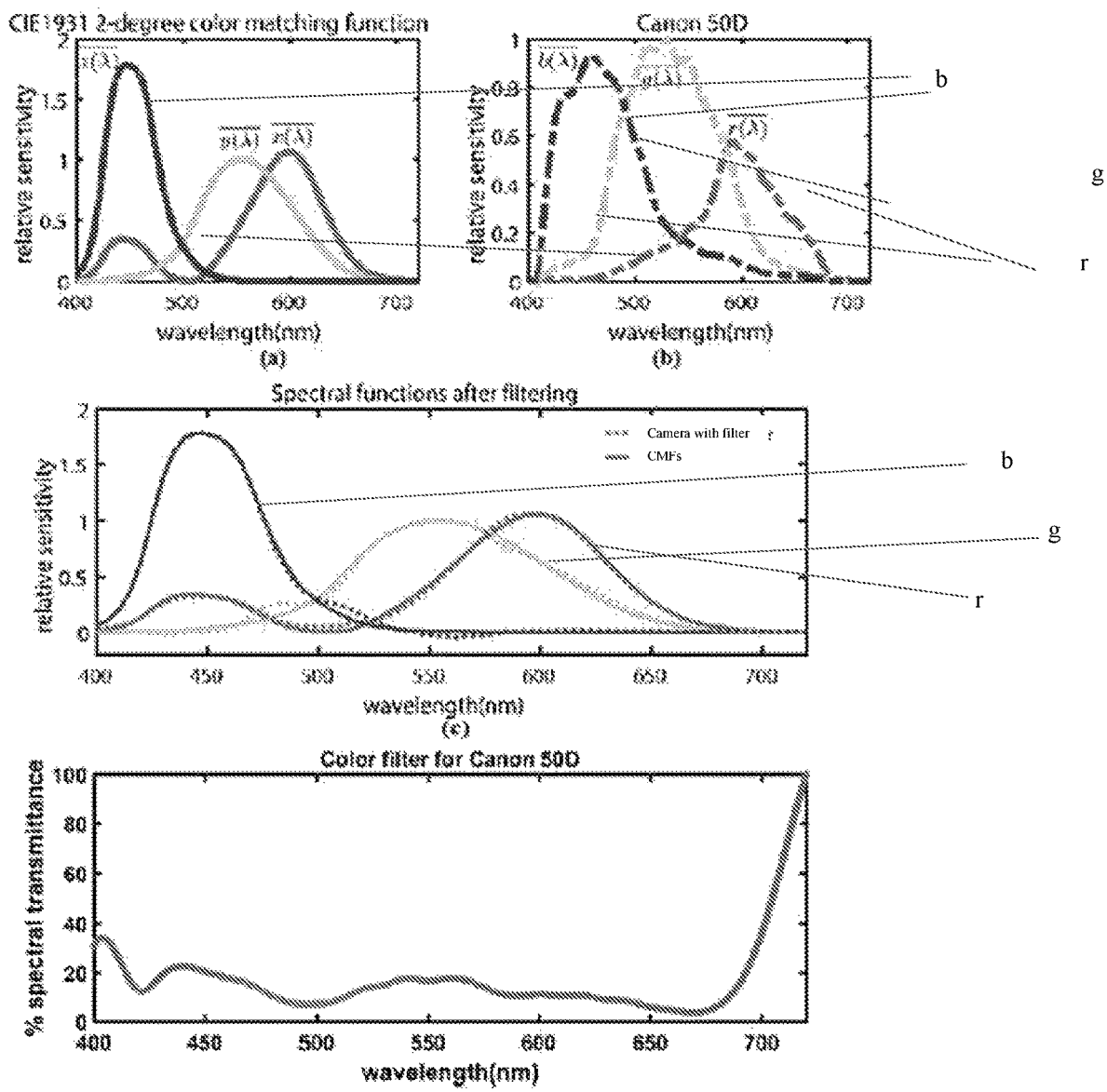
FIG. 3 shows graphs of spectral distributions.

In the above algorithm, we can make an initial guess for a starting point from which to optimise the filter by ignoring the linear correction term M. See step 4. Then we hold the filter fixed and solve for M (step 5). Taken together we estimate a new 'corrected' (partial solution) spectral sensitivities. We repeat this process until convergence (the method is guaranteed to converge). In FIG. 3, top left (a) we show the CIE1931 2° colour matching functions. Top right (b) shows the Canon D50 spectral sensitivities normalised at 560 nm. Graph (c) shows reconstructed camera response functions with designed filter and linear mapping (dotted lines) comparing to reference CMFs (solid lines) and (d) shows the spectral transmittance of the colour filter solved for the camera over the measurement range.

Using the above algorithm 1a, we solve for the filter shown in the bottom of the diagram. Multiplying the D50 sensitivities by this filter (and linear fitting to the XYZ colour matching functions) we arrive at the comparison shown in the middle (c) of the diagram (solid, XYZ colour matching functions and dotted the approximation). As will be appreciated, there is a very close fit.

Let us now consider finding a filter for a given set of measured spectra. In the discrete domain let us represent the spectral functions as the 31-vectors $\underline{f}$ and $\underline{c}$. Unfortunately, component-wise multiplication of vectors do not exist in linear algebra. Rather $\underline{f}$ must be re-expressed as a diagonal matrix:

$$D(\underline{f}) = \text{diag}(\underline{f}) \begin{cases} D(\underline{f})_{ij} = 0 & \text{if } i \neq j \\ D(\underline{f})_{ij} = f_i & \text{otherwise} \end{cases} \quad (11)$$

Now, $D(\underline{f})\,\underline{c}$ equals the component-wise multiplication of $\underline{f}$ and $\underline{c}$.

Referring again to FIGS. 1a and 1b, for a given set of measured colour signal spectra and camera sensitivities, we can calculate the camera RGBs and the corresponding tristimuli.

Now we wish to find a transmittance filter—that we can place in front of the camera—that will allow the RGBs to be corrected more accurate. That is, when we carry out a least-squares regression of the filtered RGBs we are closer to the ground-truth XYZs.

A high-level mathematical formulation of the optimisation—for finding the optimal filter supporting colour correction—can be addressed as:

$$\min_{\underline{f},M} \|C^t \text{diag}(\underline{f}) QM - C^t X\| \quad (12)$$

As before, C denotes a set of N combinations of colour signal spectra. Respectively, Q and $\chi$ are the 31×3 matrices encoding the spectral sensitivities of the camera and XYZ colour matching functions. The colour filter is denoted by the 31×1 vector $\underline{f}$. The function diag( ) turns a vector into a diagonal matrix where the filter components are mapped to the diagonal of the matrix as described above. Finally, M denotes a colour correction matrix.

The form of Equation 12 is bilinear. That is to say we are solving for $\underline{f}$ and M, and if one (or the other) is held fixed the problem becomes a simple linear optimisation. This is advantageously exploited in embodiments of the present invention to solve for the optimisation overall. An example approach taken in preferred embodiments is set out below in algorithm 2. Notice in this preferred embodiment we also constrain the filter to be between 0 and 100% transmissive:

---

1: $\quad i = 0, M_{3\times3}{}^0 = I, R^0 = C^t Q$
2: $\quad$ repeat
3: $\quad\quad i = i + 1$
4: $\quad\quad \min_{\underline{f}^i} \|C^t \text{diag}(\underline{f}^i) Q M^{i-1} - C^t \chi\|$, subject to $0 \leq \underline{f}^i \leq 1$
5: $\quad\quad \min_{M^i} \|C^t \text{diag}(\underline{f}^i) Q M^i - C^t \chi\|$
6: $\quad\quad R^i = C^t \text{diag}(\underline{f}^i) Q M^i$
7: $\quad$ until $\|R^i - R^{i-1}\| < \epsilon$
8: $\quad$ return $\underline{f} = \underline{f}^i$ and $M = M^i$

---

Most of the optimisation shown in Algorithm 2 is straightforward. Particularly in Step 5, where are solving a normal linear regression (and can use the Moore-Penrose inverse). However, solving for the filter $\underline{f}$ is more complex. It is still linear, ultimately, and can be solved using the Moore-Penrose inverse but there is some 'book-keeping' (equation rearranging) to be done.

First, let us rewrite diag($\underline{f}$) in the following way:

$$\text{diag}(\underline{f}) = \quad\quad\quad\quad (13)$$

$$f_1 \begin{pmatrix} 1 & & \\ & 0 & \\ & & \ddots \\ & & & 0 \end{pmatrix} + f_2 \begin{pmatrix} 0 & & \\ & 1 & \\ & & \ddots \\ & & & 0 \end{pmatrix} + \ldots + f_{31} \begin{pmatrix} 0 & & \\ & 0 & \\ & & \ddots \\ & & & 1 \end{pmatrix} =$$

$$f_1 D_1 + f_2 D_2 + \ldots + f_3 D_{31}$$

where matrix $D_i$ is a sparse matrix having one non-zero value in the $i^{th}$ diagonal. Based on this property, the calculation of $C^t \text{diag}(\underline{f}) QM$ can be expressed as follows:

$$C^t \text{diag}(\underline{f}) QM = [f_1 C^t D_1 QM + f_2 C^t D_2 QM + \ldots + f_3 C^t D_{31}] QM \quad (14)$$

Let us now define the vector $\underline{V}_j=\text{vec}(C^tD_iQM))$ where the vec( ) function strips out a matrix into a vector (we put each column of the underlying matrix on top of each other, the vector $\underline{V}_1$ is the first column followed by the second and third etc). Similarly, we vectorise on the human response and define $X=\text{vec}(C^t\chi)$. Step 4 of algorithm 2 can now be reformulated as:

$$\min_{\underline{f}}\|V\underline{f}-X\| \qquad (15)$$

The same vectorisation is operated on the matrix X. The filter can now be easily solved by least-squares regression as $\underline{f}=V^+X$.

Using this newly calculated filter $\underline{f}$, we can solve the mapping matrix M as $$M=(C^t\,\text{diag}(\underline{f})Q)+(C^t\chi) \qquad (16)$$

Because solving for the filter or the colour correction matrix is solving a least-squares problem, then the error reduces at each stage in the optimization. Further it is well known that Alternating Least-Squares problems (of which Algorithm 2 is a particular case) also converge.

The optimised filter produced by algorithm 1 or 2 defines per wavelength scalings which, in combination with the discovered linear transform, best matches the second sensor set. To be manufacturable, a transmittance filter needs to be values between 0 and 1. Assuming that the filter in in the interval [0,k] where k>1 then we can multiply the filter by 1/k and multiply the linear transform by k.

Further, we can carry out a constrained minimisation. That is at each iteration of the algorithm (1 or 2) we can find the scaling factors so that they lie in a prespecified transmittance range. We can do this using Quadratic programming (see FIG. 4b).

We might also constrain the shape of the filter e.g. so it is smooth or so it adheres to constraints placed by a manufacturer e.g. that the final filter is based on a model of manufacturable transmittances.

Finally, given a large corpus of pre-existing transmittance filters, a closest match or other optimisation approach can be applied to select the filter with parameters closest to those identified. Likewise, we could try N pre-existing filters in combination.

In the paper "Estimating individual cone fundamentals from their color-matching functions," J. Opt. Soc. Am. A, vol. 33, pp. 1579-1588, 2016. by C. F. Andersen, G. D. Finlayson, and D. Connah, a copy of which is hereby incorporated in its entirety herein, cone sensitivities are discovered by modelling colour matching functions as optical pre-filtering and linear combination of the cone absorptances. That work, in effect, attempts to find the optical prefiltering given known absorptances and known colour matching functions by trying to solve a known (and accepted) physical model. The approach presented here is entirely optimisation based. There is no a priori reason why a filter should be able to make a colour camera colorimetric (the idea is entirely novel). Further, the idea of finding a filter to best account for the response to actual measured response data is not envisaged in the above paper.

It is important to note that from a physical perspective, the transmittance of the filter must be within the range [0, 100%]. Therefore Equation 15 is solved subject to $0<=f<=1$. This constraint condition can be achieved using Quadratic programming (least-squares problem as in Equation 15 can be easily converted) where we apply the upper and lower constraints upon the parameters.

Although generation of a filter may in many cases include creation or selection of a physical filter, it will be appreciated that a filter could also be generated by appropriate control signals to smart glass or other programmable optical filters.

Experimental Results

In order to measure the quality of filtered camera (using filters determined from algorithm 1) with respect to the desired CMFs, we adopted the measures of Vora-Value (P. L. Vora and H. J. Trussell, "Measure of goodness of a set of color scanning Iters," J. Opt. Soc. Amer. A, vol. 10, no. 7, pp. 1499-1508, 1993) and normalized spectral root-mean-square error (NRMSE).

The Vora-Value is defined in Equation 17 as:

$$\upsilon(X,Q)=\frac{\text{Trace}_{(XX^+QQ^+)}}{3} \qquad (17)$$

The Trace function sums up the terms along the diagonal of a matrix.

The Vora-Value returns a number between 0 and 1 meaning respectively not colorimetric at all and 100% colorimetric. Pragmatically, a sensor system that has a Vora-Value above 0.9 captures colours that a 3×3 matrix can correct to XYZs to a tolerable perceptual error (e.g. the colours will look mostly correct and the visual error will be acceptable). A Vora-Value above 0.99 is indicative of a camera that is almost colorimetric i.e. to all practical purposes will sense the world like we do.

The normalized spectral NRMSE between corrected camera sensitivity functions and desired CMFs is defined as:

$$NRMSE=\frac{\|X-QQ^+X\|_F}{\|X\|_F} \qquad (18)$$

The performance of our proposed filter design method is evaluated with respect to a set of the measured spectral sensitivities of 28 commercial cameras. A large component of the set comprises 9 Canon and 10 Nikon cameras. As a final note the data is given from 400 to 720 nm through 10 nm interval so we use 33 sample points in our calculations.

For each camera, a specific filter and a linear transformation were calculated using Algorithm 1 developed in the last section. FIG. 2(d) displays an example of colour filter calculated for Canon 50D. The relative spectral transmittance values are positive in the range between 0 and 100%. The Canon camera sensitivities multiplied by the filter with a linear combination applied are shown in dotted lines in FIG. 2(c). The filter corrected sensitivities are almost the same as the XYZ colour matching functions.

In terms of Vora-Value the Canon 50D which was originally 0.950 becomes 0.992. The NRMSE improves from 0.250 to 0.052, reduced by nearly 80%. By applying this colour filter and linear mapping, Canon 50D camera becomes almost colorimetric.

In Table 1, we look at the Vora-Value and NRMSE performance before and after a filter is added (with linear correction). The first three rows of the table show the performance of 3 cameras which—post filter correction—have the maximum, median and minimum Vora-Values. Then we look at the average performance of the Canon and Nikon cameras as separate subgroups. Finally, the average performance over the whole data set is summarized. We repeat this methodology for NRMSE.

TABLE 1

Performance of camera systems with colour filter versus the original functions using Vora-Value and NRMSE

|  | Original + filter | | Original | |
| --- | --- | --- | --- | --- |
| Camera | Vora-Value | NRMSE | Vora-Value | NRMSE |
| Best-Canon50D | 0.992 | 0.052 | 0.950 | 0.250 |
| Median-NikonD40 | 0.947 | 0.104 | 0.924 | 0.305 |
| Worst-NikonD90 | 0.941 | 0.113 | 0.922 | 0.317 |
| Canon group | 0.987 | 0.062 | 0.938 | 0.285 |
| Nikon group | 0.944 | 0.108 | 0.921 | 0.316 |
| Whole data set | 0.961 | 0.091 | 0.918 | 0.316 |

Spectrally, all cameras are improved to some extent. About 50% of the cameras lend themselves to significant improvements in their colour measurement ability. This is an interesting result since it shows that within the range of manufacturable sensors there are sets which can be made much more colorimetric with the addition of a coloured filter. These cameras could then be used in applications where accurate colour measurement is needed.

Taken as a group, Canon cameras can be filter-corrected to become colorimetric more readily than Nikon cameras. The corrected Canon cameras have Vora-Values of 0.972 at least, with an average value as high as 0.987 for the whole subset compared to 0.944 of Nikon subgroup.

A further experiment was then conducted. Here we wish to evaluate how well the RGBs measured by a camera can be corrected to match XYZs and how much this colour correction performance is improved when a coloured filter (designed by Algorithm 1a) is placed in front of the camera. For each camera (normal and filter corrected) we calculate the RGBs under CIE D65 for the SFU set of 1995 reflectances. We then find the optimal least-squares linear correction to best map to ground-truth XYZs. We then calculate the average, median, and 95% quantile of $\Delta E^*$ over the test data set.

Figure 5:
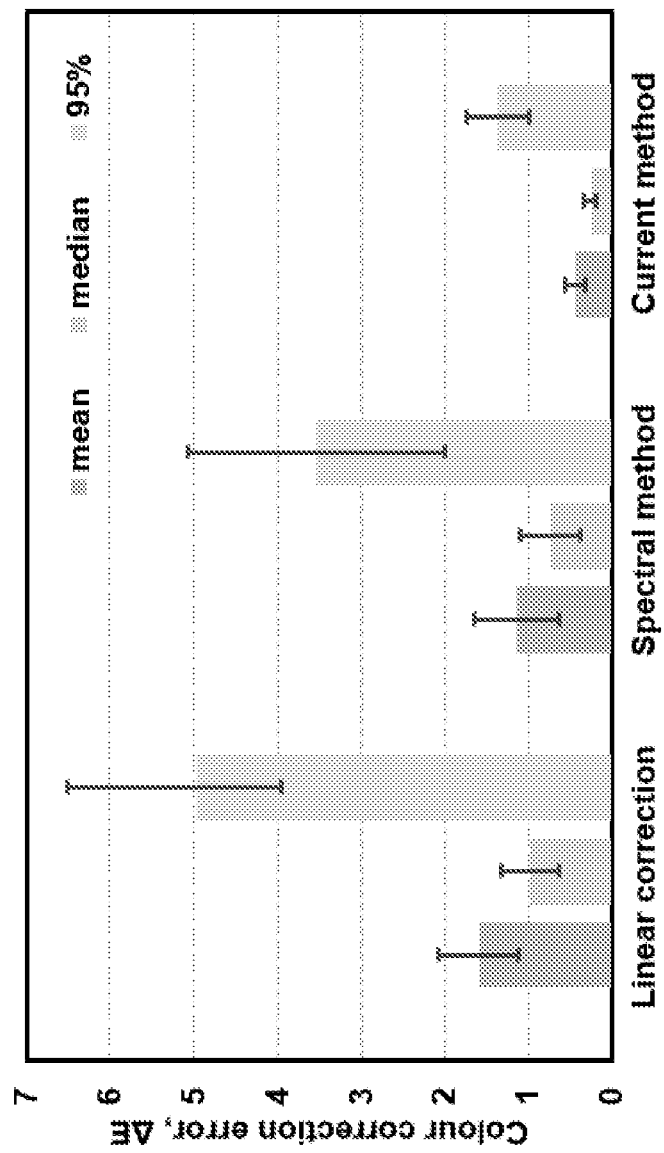
FIGS. 5-7 are graphs showing colour correction performance of filters produced according to embodiments of the present invention.

The results are presented as shown in FIG. 5. For each error statistic we show the means (i.e. the mean of the means calculated over different cameras and the mean of the medians and the mean of the 95% quantiles). We also show the spread in the error defined to be ±2 standard deviations. Whichever statistic is employed, there is over 20% on average boost in performance. However, when reviewing the cameras individually, a few cameras like Sony Nex5N and Nikon D40, are not greatly improved by pre-filtering.

In experiments using filters determined using embodiments based on algorithm 2 of the present invention, a best colour pre-filter was found for each of a set of 28 digital cameras. The colour signal tested here is a combination of CIE standard illuminant D65 with SFU-1995 reflectance data set. The filter optimization is based on the best mapping between RGBs (after filtering and linear correction) and reference XYZs as formulated in Equation 11.

Figure 4:
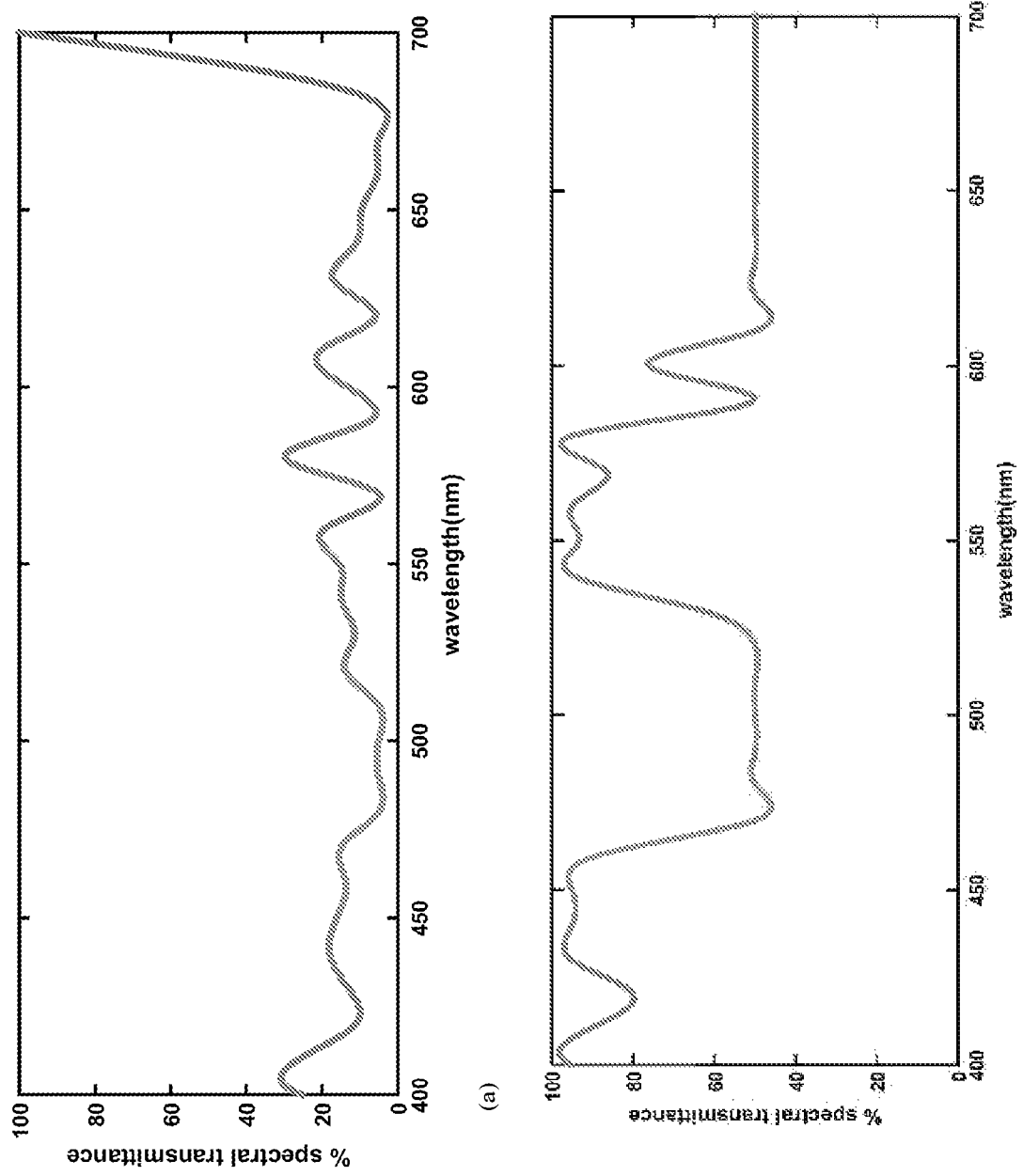
FIG. 4 shows graphs of calculated filter parameters in embodiments of the present invention.

The filter and the corresponding transform matrix for each camera device with given testing colour signal inputs are calculated through Algorithm 2. Note that in order to simulate a physically reliable filter, we constrain its parameters in the range of [0, 100%] and for the current method, the experimental results presented here (in Table 2) are based on this constraint. Taking a Canon D50 camera as an example, the filter found by bilinear least-squares is shown at the top of FIG. 4a representing the transmittance within [0, 100%].

By using the Quadratic programming technique, the boundaries for filter parameters can be easily adjusted. In FIG. 4b a variant is shown where the filter transmittance is higher constrained to be between 50% and 100% (it can be regarded as a high-transparent filter which can result in less noise issues).

An evaluation of the results was performed, compared to simple least-squares and the results of algorithm 2. The results are summarized for all 28 cameras in Table 2.

TABLE 2

Comparison of colour correction results between different methods

|  | Linear correction | | | Algorithm 1 | | | Algorithm 2 | | |
| --- | --- | --- | --- | --- | --- | --- | --- | --- | --- |
| Camera name | Mean | Median | 95 pct | Mean | Median | 95 pct | Mean | Median | 95 pct |
| Canon50D | 1.03 | 0.64 | 2.82 | 0.47 | 0.29 | 1.47 | 0.30 | 0.18 | 0.95 |
| Canon60D | 1.08 | 0.65 | 3.09 | 0.51 | 0.32 | 1.55 | 0.31 | 0.18 | 0.98 |
| Canon500D | 1.09 | 0.65 | 3.14 | 0.48 | 0.29 | 1.44 | 0.36 | 0.16 | 0.32 |
| NikonD40 | 1.11 | 0.75 | 3.30 | 1.61 | 1.08 | 4.97 | 0.42 | 0.23 | 1.35 |
| Sony Nex5N | 1.12 | 0.64 | 3.55 | 1.49 | 1.00 | 4.63 | 0.43 | 0.24 | 1.35 |
| Canon600D | 1.28 | 0.78 | 3.69 | 0.49 | 0.31 | 1.50 | 0.31 | 0.18 | 0.97 |
| Canon300D | 1.30 | 0.69 | 4.13 | 1.02 | 0.60 | 3.29 | 0.43 | 0.28 | 1.27 |
| Canon1D Mark III | 1.33 | 0.72 | 4.33 | 0.48 | 0.24 | 1.61 | 0.37 | 0.22 | 1.14 |
| PentaxQ | 1.36 | 0.90 | 4.06 | 0.85 | 0.45 | 3.03 | 0.35 | 0.20 | 1.14 |
| PentaxK5 | 1.39 | 0.83 | 4.35 | 1.56 | 1.06 | 4.81 | 0.43 | 0.24 | 1.35 |
| NikonD700 | 1.40 | 0.80 | 4.59 | 1.62 | 1.07 | 4.98 | 0.43 | 0.24 | 1.35 |
| NokiaN900 | 1.41 | 1.01 | 3.86 | 0.60 | 0.35 | 1.90 | 0.40 | 0.25 | 1.26 |
| NikonD50 | 1.43 | 0.97 | 4.45 | 1.73 | 1.14 | 5.35 | 0.49 | 0.28 | 1.57 |
| NikonD3 | 1.45 | 0.84 | 4.63 | 1.60 | 1.06 | 4.92 | 0.43 | 0.24 | 1.37 |
| Nikon3dx | 1.46 | 0.83 | 4.76 | 1.65 | 1.11 | 5.06 | 0.48 | 0.27 | 1.54 |
| NikonD200 | 1.50 | 0.91 | 4.82 | 1.66 | 1.10 | 5.12 | 0.43 | 0.24 | 1.38 |
| NikonD90 | 1.54 | 0.87 | 5.05 | 1.66 | 1.11 | 5.11 | 0.48 | 0.27 | 1.51 |
| NikonD5100 | 1.61 | 0.91 | 5.12 | 1.59 | 1.06 | 4.89 | 0.46 | 0.26 | 1.44 |
| Canon40D | 1.65 | 1.03 | 4.92 | 0.46 | 0.25 | 1.47 | 0.41 | 0.26 | 1.29 |
| Canon5D Mark II | 1.65 | 1.03 | 4.92 | 0.46 | 0.25 | 1.47 | 0.41 | 0.26 | 1.29 |
| NikonD300s | 1.70 | 0.94 | 5.48 | 1.59 | 1.06 | 4.86 | 0.45 | 0.26 | 1.40 |
| Olympus EPL2 | 1.77 | 1.15 | 5.56 | 1.33 | 0.85 | 4.15 | 0.47 | 0.27 | 1.48 |
| NikonD80 | 1.91 | 1.14 | 6.19 | 1.62 | 1.07 | 4.91 | 0.42 | 0.24 | 1.37 |
| Phase One | 1.95 | 1.18 | 6.24 | 0.74 | 0.43 | 2.37 | 0.27 | 0.17 | 0.83 |
| Canon20D | 2.01 | 1.13 | 6.60 | 0.68 | 0.43 | 2.15 | 0.38 | 0.23 | 1.19 |

TABLE 2-continued

Comparison of colour correction results between different methods

| Camera name | Linear correction | | | Algorithm 1 | | | Algorithm 2 | | |
| --- | --- | --- | --- | --- | --- | --- | --- | --- | --- |
| | Mean | Median | 95 pct | Mean | Median | 95 pct | Mean | Median | 95 pct |
| PointGreyG | 2.45 | 1.74 | 7.28 | 1.43 | 0.98 | 4.38 | 0.64 | 0.39 | 1.99 |
| Hasselblad | 2.65 | 1.65 | 8.45 | 0.89 | 0.57 | 2.78 | 0.81 | 0.55 | 2.54 |
| PointGreyG2 | 3.03 | 2.07 | 9.38 | 1.60 | 1.08 | 4.90 | 0.71 | 0.42 | 2.27 |
| Mean | 1.60 | 0.98 | 4.96 | 1.14 | 0.74 | 3.54 | 0.44 | 0.26 | 1.37 |

In the first three columns of the table, we record the mean, median and 95 percentile of colour difference errors in terms of CIELAB $\Delta E^*_{ab}$ for the SFU-1995 reflectance data set viewed under a CIE D65 illuminant. In the second set of three columns we record the performance of a prior filter design method (that tries to find a filter so a camera best matches the Luther Condition). Finally, in the last three columns we record the colour correction performance by embodiments of the present invention (labelled "current method"). The overall colour correction performance is drawn in FIG. 5 listing the results by these three methods (from left to right) with overall colour correction performance in terms of mean (left), median (middle), 95 percentile colour (right) differences with error bars.

The current filtering method can achieve as small error as $0.4 \pm 0.12 \Delta E^*_{ab}$ by averaging the whole camera set. The overall medium error is even smaller, reaching $0.26 \pm 0.08 \Delta E^*_{ab}$.

Clearly, embodiments of the present invention find filters which support a step change in our ability to correct camera colour responses. Compared to the linear colour correction and according to the mean, median and 95% percentile error measures, the recorded error by current method is much less (typically only 20%-35% of those by the linear correction method). Comparing to the former spectral-based colorimetric filter design, embodiments of the present invention outperforms in all three measures, especially for the Nikon cameras which illustrate a significant improvement. Among the camera set, Canon 500D achieves the best results which are all under the "Just Noticeable Difference" test (Wyszecki, G., Stiles, W. S.: Color Science: Concepts and Methods, Quantitative Data and Formulae. 2nd ed. New York: Wiley (1982)).

Figure 6:
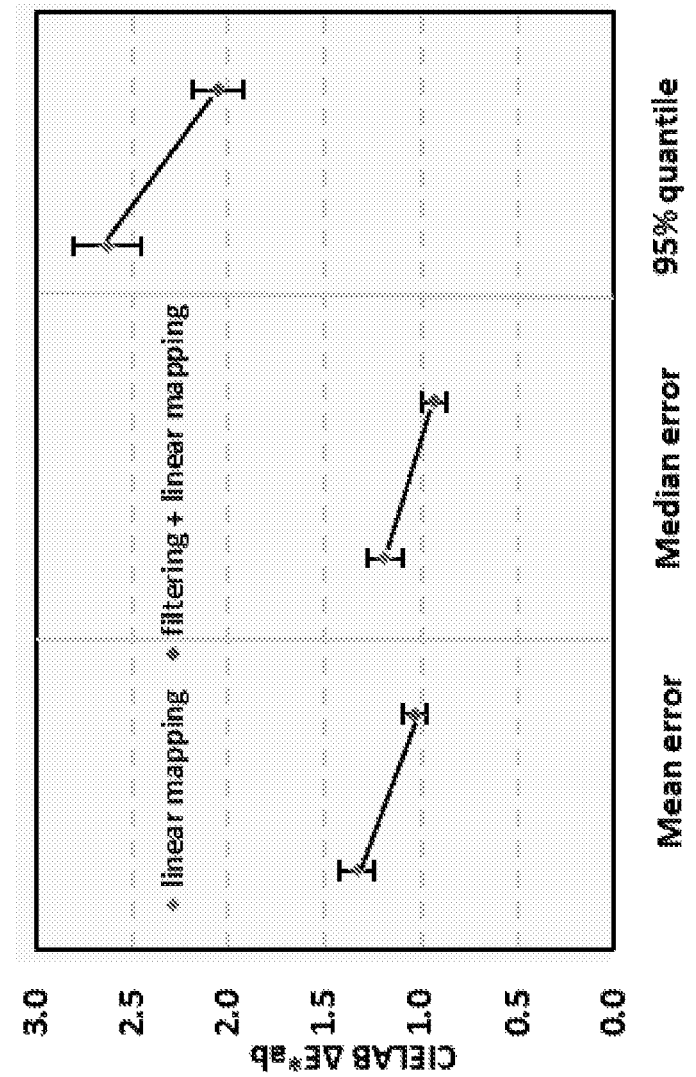
Figure 7:
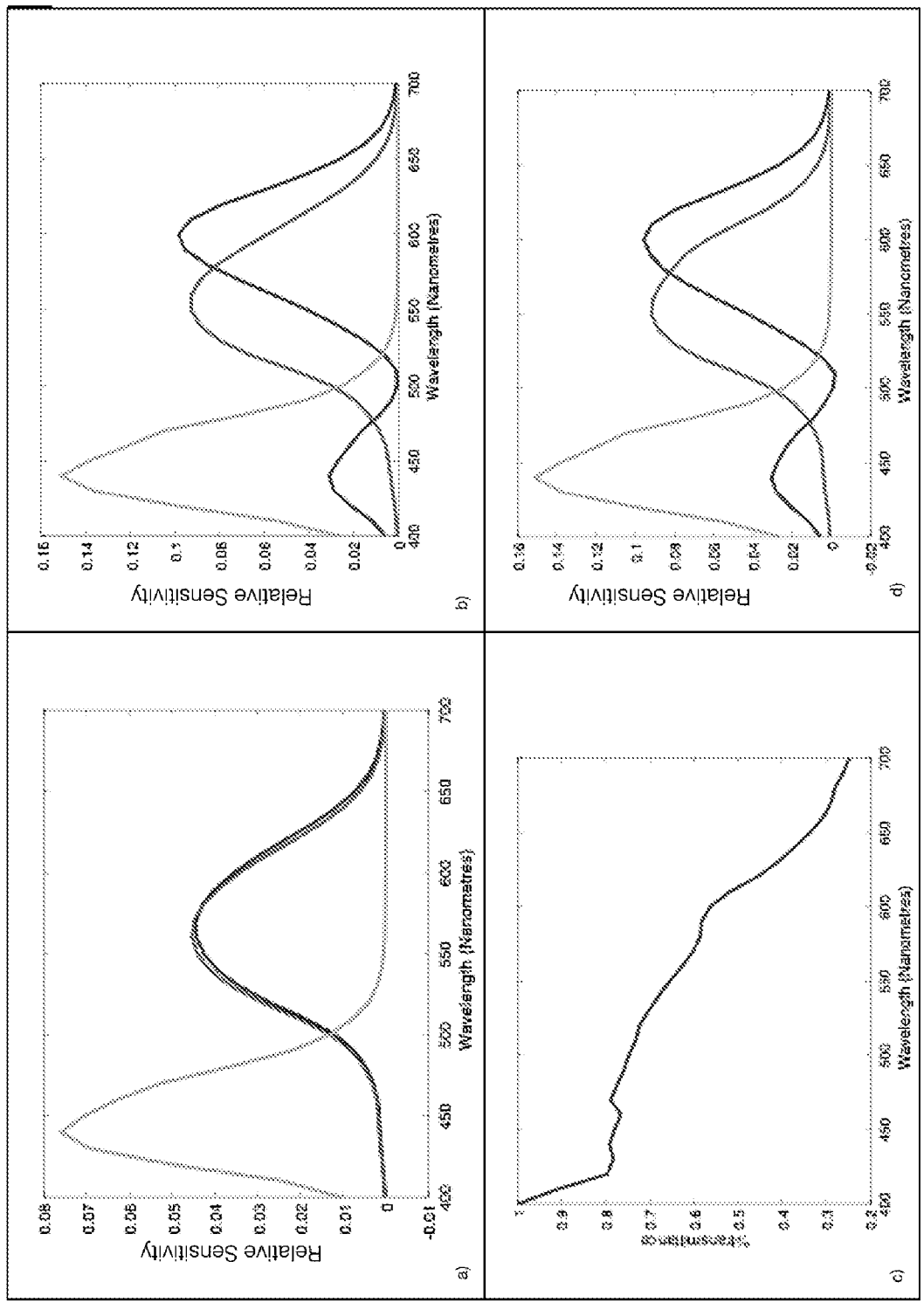

FIG. 6 shows a comparison the performance of colour correction between colour pre-filtering with linear mapping and direct linear mapping. The left hand square of each pairing represent direct linear correction (mapping), while the right hand squares show the results by colour pre-filtering with linear correction (mapping). On the horizontal axis, there lists three indicators respectively mean, median and 95% quantile of the colour differences for the SFU reflectance data set under CIE D65. The trend of the three measures is consistently dropping showing the reduction of colour error As a final test of our method we took measured deuteranomalus spectral sensitivities shown in FIG. 7a. We now according to our method wish to find a filter—in combination with a linear transform—to match the XYZ colour matching functions shown in 7b. In FIG. 7c we show the filter designed according to algorithm 1. The filter deteranomalous sensitivities, filtered and then multiplied by a linear transform are shown bottom right. The Vora Value of 6d is 0.997 i.e. the filter corrected anomalous response is, for all practical purposes, colorimetric.

In summary, embodiments of the present invention apply a method to find the optimal filter (to be placed in front of a camera) to make a device most colorimetric via optimisation. Experiments show that this method provides dramatic improvement over direct linear correction operating on raw unfiltered RGBs. Compared to normal linear correction the errors (calculated as mean, median or 95% $\Delta E^*_{ab}$) are reduced by 75% on average.

It is to be appreciated that certain embodiments of the invention as discussed above may be incorporated at least in part as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention.

The invention claimed is:

1. A method for generating a colour filter for modifying the spectral response of a vision system to make the vision system more colorimetric and satisfy filter design criteria $$\min_{f(\lambda),M} \|f(\lambda)[MtQ(\lambda)] - \chi(\lambda)\|,$$

where $f(\lambda)$ defines the spectral transmittance of the colour filter, M is a fixed 3×3 linear transformation matrix $Q(\lambda)$ denotes the vector of red-spectral, green-spectral and blue-spectral sensitivities and $x(\lambda)$ denotes the colour matching functions, the method comprising:
receiving an RGB spectral response of the vision system for a colour target under predetermined illumination;
executing, by a processor of a computer system, computer program instructions configured to apply the RGB spectral response to a bilinear optimisation problem that simultaneously determines:
  i) a colour correction matrix to transform the RGB spectral response to XYZ colour space; and,
  ii) spectral transmission parameters of the colour filter; executing computer program instructions configured to solve the bilinear optimisation problem by:
solving $$\min_{D,M} \|DQM - x\|,$$

where Q and χ are respectively N×3 matrices capturing the spectral response of the vision system and the XYZ colour matching functions, N refers to the sampling number across the visible range, M is a 3×3 correction matrix and D is an N×N diagonal matrix, or
solving $$\min_{f,M} \|C^t \mathrm{diag}(f)QM - C^t \chi\|,$$

where C denotes an A×N set of colour signal spectra, Q and χ are the A×3 matrices encoding, respectively, the spectral response of the vision system and XYZ colour matching functions, where A comprises the number of samples taken, the sampling being performed at predetermined intervals; and,
providing a colour filter using the parameters.

2. The method of claim 1, wherein the XYZ colour space is determined using a colour matching routine for the colour target under the predetermined illumination.

3. The method of claim 2, wherein the colour matching routine is a CIE XYZ colour matching function.

4. The method of claim 1, wherein the RGB spectral response is obtained from an observer with normal colour vision and XYZ colour space is determined by an observer suffering from colour blindness.

5. The method of claim 1, wherein the colour target is illuminated by a reference set of illuminant spectra and has predetermined surface reflectances.

6. The method of claim 1, wherein the problem is a bilinear least-squares estimation problem.

7. The method of claim 1, wherein the step of executing computer program instructions configured solving the bilinear optimisation problem comprises solving the bilinear optimisation problem by executing computer program code to perform one or more operations selected from the set of:
solving by alternating least-squares;
solving by random, sampling and consensus; and,
regulating the solution to control the shape of the filter.

8. The method of claim 1, further comprising sampling across the RGB spectral response and XYZ colour space across 400 nm to 700 nm light spectra at predetermined intervals to give A samples for each of the RGB and XYZ.

9. The method of claim 8, wherein the predetermined interval is a 10 nm interval.

10. The method of claim 8, further comprising forming an RGB matrix and an XYZ matrix from the respective A sampled values and solving the optimisation problem from the matrices for the matrix M that best maps RGBs to XYZ tristimuli.

11. The method of claim 10, wherein the step of solving is by alternating least squares, ALS, the method further comprising:

making an initial guess for a starting point from which to optimise the filter by ignoring a linear correction term M;
holding the filter fixed and solving for M;
estimating new corrected spectral sensitivities;
repeating the ALS optimization until convergence.

12. The method of claim 1, further comprising constraining the filter to be between 0 and 100% transmissive using Quadratic programming.

13. The method of claim 1, where the filter is sought to minimize a non-linear error metric including CIE Lab.

14. The method of claim 1, wherein the step of providing the parameters comprises selecting a closest singular match, or a closest match by combining filters, from a predetermined set of existing filters.

15. The method of claim 1, wherein the step of providing comprises providing the parameters to a manufacturing system to create the filter.

16. The method of claim 1, wherein the step of providing comprises generating control signals to cause a smart glass or programmable optical filters to operate according to the parameters.

17. The method of claim 1, further comprising capturing two RGB response images, one image with and one without a filter between the vision system and the target, finding a 6×3 linear matrix mapping the 6 pixel measurements to the target XYZs, the 6 pixel measurements being the R, G, and B values from each image.

18. The method of claim 15, wherein the step of capturing comprises taking the two images successively.

19. The method of claim 15, wherein the step of capturing comprises splitting light from a scene into two optical paths and capturing one image from each of the two paths for simultaneous capture.

20. A system for generating a colour filter for modifying the spectral response of a vision system to make the vision system more colorimetric and satisfy filter design criteria $$\min_{f(\lambda),M} \|f(\lambda)[MtQ(\lambda)] - \chi(\lambda)\|$$

where f(λ) defines the spectral transmittance of the colour filter, M is a fixed 3×3 linear transformation matrix Q(λ) denotes the vector of red-spectral, green-spectral and blue-spectral sensitivities and x(λ) denotes the colour matching functions, the system comprising:
an input interface configured to receive an RGB spectral response of the vision system for a colour target under predetermined illumination;
a processor configured to execute computer program instructions configured to apply the RGB spectral response to a bilinear optimisation problem and solve the problem to simultaneously determine:
  i) a colour correction matrix to transform the RGB spectral response to XYZ colour space; and,
  ii) spectral transmission parameters of the colour filter;
by:
solving $$\min_{D,M} \|DQM - x\|,$$

where Q and x are respectively N×3 matrices capturing the spectral response of the vision system and the XYZ colour matching functions, N refers to the sampling number across the visible range, M is a 3×3 correction matrix and D is an N×N diagonal matrix, or solving $$\min_{f,M} \|C^t \mathrm{diag}(f) QM - C^t \chi\|,$$

where C denotes an A×N set of colour signal spectra, Q and $\chi$ are the A×3 matrices encoding, respectively, the spectral response of the vision system and XYZ colour matching functions, where A comprises the number of samples taken, the sampling being performed at predetermined intervals; and, an output interface configured to provide the parameters for the colour filter.

21. The method of claim 1 wherein the RGB spectral response is obtained from an observer suffering from colour blindness and the XYZ response is obtained from an observer with normal colour vision.

\* \* \* \* \*